BULLOCK & HANIGAN.
Dumping Wagon.
No. 83,920.
Patented Nov. 10, 1868.
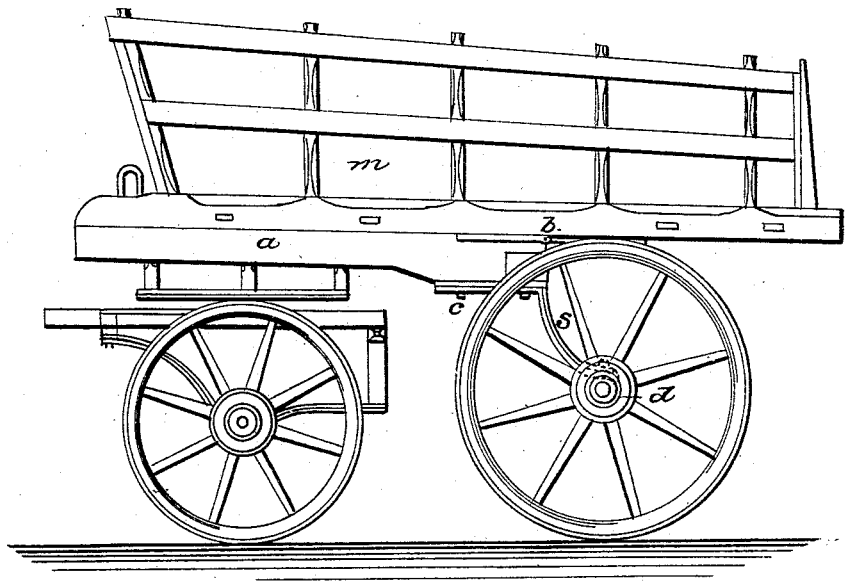

UNITED STATES PATENT OFFICE.

WILLIAM S. BULLOCK AND HUGH HANIGAN, OF WILMINGTON, DELAWARE.

IMPROVEMENT IN DUMPING-WAGONS.

Specification forming part of Letters Patent No. 83,920, dated November 10, 1868.

*To all whom it may concern:*

Be it known that we, WILLIAM S. BULLOCK and HUGH HANIGAN, of the city of Wilmington, in the county of New Castle and State of Delaware, have invented a new and Improved Dumping-Wagon; and we do hereby declare that the following is a full, clear, and exact description of the construction and operation of the same, reference being had to the annexed drawing, making a part of this specification, in which a side view of the cart is shown.

$a$ is the frame on which the body of the wagon rests; $b$, the hinge, holding the body of the wagon to the frame. $s$ is the spring.

We construct the body of the wagon in the ordinary manner, setting it upon a frame which is only two-thirds the length of the body, the back or rear part of the wagon having no frame to support it. To the rear end of the frame and to the timber of the body we attach two hinges of sufficient strength to hold the body in place.

When tilted, we support the wagon-body by the ordinary appliances attached to the first axle; but the construction of the support to the hind axle is entirely new.

We attach a heavy spring, $s$, to the frame supporting the body at $c$. This spring is curved outward toward the rear of the cart, and fastened to the axle in the ordinary manner by a clip.

The hind wheels are not set as far back as in the ordinary wagon, in order to allow the tilting of the body, which is kept in place by a key-stick, as in the ordinary cart.

When a load is required to be dumped, the key-stick being removed by pressure upon the rear end of the wagon-body, it tilts, coming down over the hind axle.

What we claim as our invention, and desire to secure by Letters Patent, is—

The combination of the curved springs $s$, bed-frame $a$, applied and operating in connection with the hind axle $d$ and body $m$, as herein shown and described, for the purposes specified.

WM. S. BULLOCK.
HUGH HANIGAN.

Witnesses:
EDWARD J. DOUGHERTY,
E. T. TAYLOR.